United States Patent [19]

Krämer

[11] Patent Number: 5,210,593
[45] Date of Patent: May 11, 1993

[54] GAUGE FOR MEASURING THE THICKNESS OF AN UNSUPPORTED WEB

[75] Inventor: Werner Krämer, Unterlindelbach, Fed. Rep. of Germany

[73] Assignee: Fag Kugelfischer Georg Schafer KGAA, Fed. Rep. of Germany

[21] Appl. No.: 786,373

[22] Filed: Nov. 1, 1991

[30] Foreign Application Priority Data

Nov. 19, 1990 [EP] European Pat. Off. .......... 90122068

[51] Int. Cl.⁵ ............................................. G01B 11/06
[52] U.S. Cl. .................................. 356/381; 356/373; 250/560
[58] Field of Search ............... 356/373, 375, 376, 381, 356/382, 1; 250/560

[56] References Cited

U.S. PATENT DOCUMENTS 4,276,480  6/1981  Watson ................................. 356/381
5,107,132  4/1992  Pastor et al. ......................... 356/376

FOREIGN PATENT DOCUMENTS 2167179  5/1986  United Kingdom .

Primary Examiner—F. L. Evans
Attorney, Agent, or Firm—Ostrolenk, Faber, Gerb & Soffen

[57] ABSTRACT

A gauge for measuring the thickness of an unsupported web. One triangulation sensor is located above and the other is located below the web. Each triangulation sensor includes a laser whose beam is bounced off the web to a position sensitive detector in the sensor, which determines the distance of the surface of the web from the sensor. The sensors travel in synchronization along tracks, across the direction of web travel. To detect and compensate in the measurements for any sag or deflection in the track, there is a further laser either on one of the sensors or on the frame of the gauge and a respective further detector on the other one of the sensors and/or the frame of the gauge. The further detector detects the shifting of the sensor toward or away from the web and generates a signal which is combined with the triangulation signals from the sensors to calculate the thickness of the web. In one embodiment, a further laser is on one sensor and the further detector is on the sensor at the opposite side of the web. In another embodiment, a further laser is on each sensor while the further detectors are in the frame of the gauge. In another embodiment, the further laser is on the frame while the further detector is on the sensor. In the latter embodiment, a beam splitter splits the beam between the further detector and a photosensitive diode for zeroing the further detector.

20 Claims, 2 Drawing Sheets

GAUGE FOR MEASURING THE THICKNESS OF AN UNSUPPORTED WEB

BACKGROUND OF THE INVENTION

The invention concerns a gauge for measuring the thickness of an unsupported web. The gauge includes one sensor above and another sensor below the web. Each sensor includes a laser which projects its beam on the web and a detector which receives the beam reflected from the web. The laser and the detector are positioned in relation to the web such that they can carry out triangulation measurements of the distance of the web from the laser and the detector. The web can be one that is produced continuously or discontinuously, and can be a sheet of any material, for example.

A wide range of thickness measuring procedures and instruments are known. The traditional approach utilizes the absorption of ionizing radiation and allows for the requisite precision, subject to long term operation in aggressive conditions. One drawback of this technique, however, is that it employs radioactive sources, which can be detrimental to the environment and also constitutes a health hazard.

Infrared, capacitative, inductive, and laser-triangulation methods have accordingly been developed. All of these entail specific drawbacks, however, which are not discussed herein. All of these procedures and instruments depend on a sensor or sensors that travel along a respective sensor track that extends across the web perpendicular to its direction of travel. Precision depends not only on the level of resolution necessitated by the particular process but also on the straightness, true direction and stability of the tracks. As long as the webs being measured are less than 150 cm wide, the sensor can be secured to a stable C-shaped support. Measuring the thickness of webs 150 cm or wider, however, requires a rectangular frame, whose geometry dictates that it cannot be as stable as a C-shaped support. When the thickness of such a wide web is being measured, the track that the sensor travels on may sag and this will result in inaccurate measurements.

Positioning an eddy current detector in the sensor to compensate for the sag is known. The detector remotely monitors the surface of a reference cylinder while the other components of the sensor monitor the surface of the web. The thickness of the web is calculated from the difference between the two results. Since this approach employs a reference cylinder, it is inappropriate for measuring webs that arrive of the sensor unsupported.

SUMMARY OF THE INVENTION

The object of the invention is to improve a web thickness gauge so that any sag in the track being traveled over by the gauge sensor can be detected while the sensor is traveling along the track across a web, and particularly an unsupported web, that is being measured.

According to the present invention, a respective laser and an associated reflected beam detector are positioned on a sensor located above each surface of the web. The sensor travels back and forth along a track that is perpendicular to the direction the web is traveling. Another laser is positioned where it will shine on another respective detector in the event of any deviations in the vertical motion of one or both of the sensors. The resulting deviation signal is used to adjust the distance measurements made by the track supported sensor to account for positional changes caused by vertical deviations that might be caused by the track.

In one embodiment at least one of the sensors is associated with the other laser that is positioned so its beam will be deflected by mirrors and will shine on the associated other detector which is located at the other sensor to detect deviating vertical motion of the sensor or sensors.

In an alternate embodiment, each sensor has a respective other laser that is positioned where its beam will shine on its associated other detector which is in or on the frame of the gauge to detect deviating vertical motion of the sensor or sensors.

In yet another embodiment, a respective other laser associated with each sensor is positioned in or on the frame of the gauge. The laser beam passes through a beam splitter which directs the beam onto a detector in the associated sensor and also to a zero-calibration photodiode in or on the frame of the gauge which detects deviating vertical motion of the sensor or sensors.

Other objects, features and advantages of the present invention will become apparent from the following description of the invention which refers to the accompanying drawings.

DETAILED DESCRIPTION OF THE PREFERRED EMBODIMENTS

Figure 1:
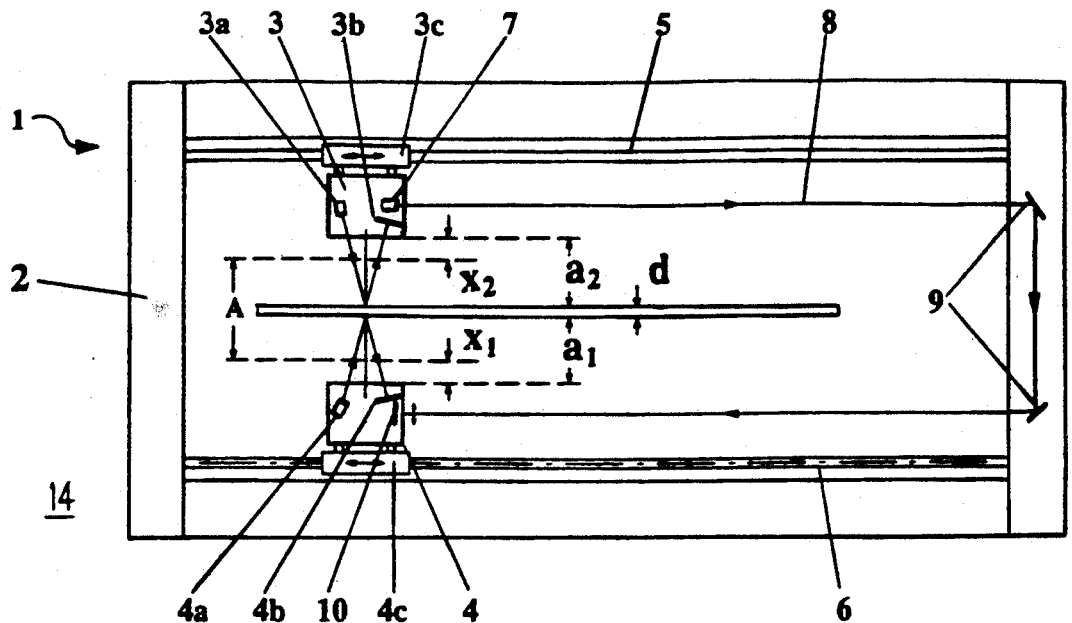
FIG. 1 illustrates a thickness gauge with a laser positioned in one sensor and a detector positioned in the other sensor to detect deviating vertical motions of the sensors.

The thickness of a web or a sheet of any material, for example, is to be measured. The web travels, in a direction into the drawing, through a rectangular cross section frame 2 of a thickness gauge 1. Inside the frame, a first sensor 3 travels back and forth on a track 5 above and parallel to the web and a second sensor 4 travels back and forth on a track 6 below and parallel the web.

Sensors 3 and 4 are provided with respective lasers 3a and 4a and respective detectors 3b and 4b for triangulation measurement. Each sensor 3 and 4 is a conventional triangulation sensor for distance measurement. The laser may be in the form of a laser diode. The laser projects a beam of light on the web. The web then acts as a secondary light source reflecting the laser beam shone on it. The light reemitted by the web is imaged through a lens system onto a position sensitive detector usually in the form of either a one or a two dimensional position sensitive diode (PSD). A charge coupled device (CCD) array may be preferred. The PSD has a surface over which the laser beam travels if the laser beam is shifted by movement of the sensor toward and away from the web. The location where the beam shines on the PSD corresponds to a shifted position of the sensor. Triangulation sensors are widely available.

One example is the laser distance sensor 3Z4M, offered by the Japanese company, Omron.

Sensors 3 and 4 are at a calibrated and prescribed systems distance A apart. The web has a thickness d.

Sensors 3 and 4 are driven back and forth on their respective tracks 5 and 6 in synchronization by respective linear drive mechanisms 3c and 4c. The synchronizing mechanisms keep the laser beams shining at directly opposite locations across the web. Tracks 5 and 6 might sag along their lengths, e.g. at their centers, to an extent or distance x1 in relation to sensor 4 and to an extent or distance x2 in relation to sensor 3. Sensor 4 is at a distance a1 away from the web and sensor 3 is at distance a2 away from the web, as determined by conventional triangulation.

The operation of the thickness gauge 1 is now described. An additional laser 7 is positioned on the sensor 3. Its beam 8 is directed toward and is deflected by mirror means comprised of two separated tilted mirrors 9, which are in or on frame 2 and are beyond the edge of the web and are directed so as to reflect the beam 8 to a detector 10 on the sensor 4. The detector 10 is also a PSD. It detects deviations in the vertical motion of sensors 3 and 4 as they move along their tracks 5 and 6. The PSD detector at 10 receives a laser beam from the inclined mirrors 9. Depending upon whether sensor 3 or 4 shifts toward or away from the web, the beam will be reflected to a different location on the PSD which can be calibrated to register a position shift of each sensor.

The measurement results from the sensors 3, 4 and 10 are emitted in the form of electronic signals to a known signal processor at 14. The signal from sensor 10 is utilized in conjunction with the signals resulting from the triangulations by sensors 3 and 4 in the processor to calculate the thickness d of the web using the formula $$d = A - [(a1 + a2)] \pm (x2 + x2)].$$

Figure 2:
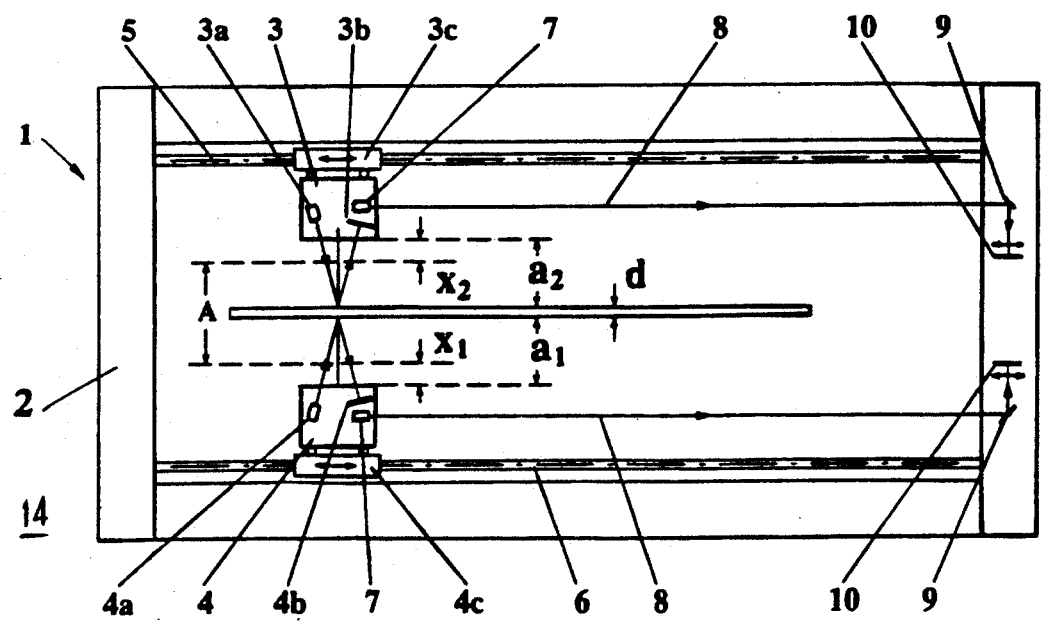
FIG. 2 shows the same type of gauge illustrated in FIG. 1 but with a laser in each sensor and an associated detector in the frame to detect deviating vertical motions of the sensors.

The thickness gauge illustrated in the embodiment of FIG. 2 has an additional respective laser 7 in each sensor 3 and 4. Each laser beam 8 from each laser is deflected by a respective mirror 9 on or in the frame 2 to a respective additional detector 10 which is in or on the frame 2. These detectors 10 detect deviations in the vertical motion of sensors 3 and 4. The results from each sensor 3, 4 and 10 are emitted in the form of electronic signals to known signal processors. The signals from the sensors 10 are utilized in conjunction with the signals resulting from the triangulations by sensors 3 and 4 to calculate the thickness d of web from the formula $$d = A - [(a1 \pm x1) \pm (a2 \pm x2)].$$

Figure 3:
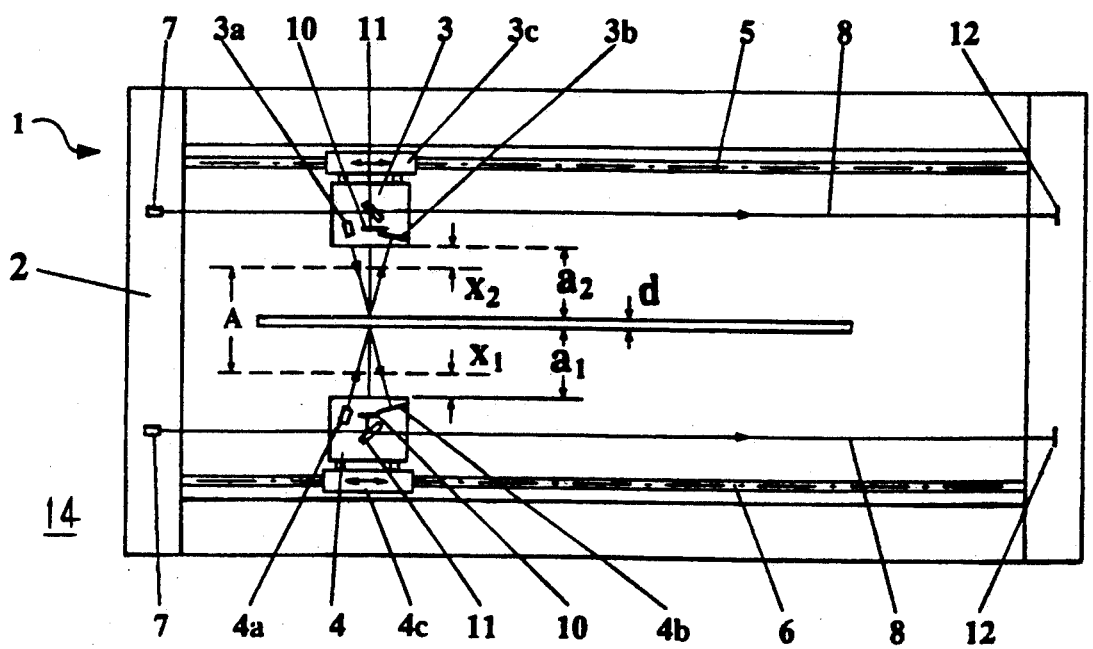
FIG. 3 shows the same type of gauge illustrated in FIG. I with a laser that associated with each sensor located in or on the frame of the gauge and a detector at the sensor.

In the embodiment of the thickness gauge 1 illustrated in FIG. 3, an additional laser 7 for each sensor 3 and 4 is positioned on or in the frame 2 such that each laser beam 8 from a laser 7 travels through a respective beam splitter 11 located in each sensor 3 and 4. The beam splitter directs the beam to a photodiode 12 which is secured in or on the frame 2 and is opposite its associated laser 7 for the purpose of zero calibration. The beam splitter also directs the beam to a detector 10 which is located in the same respective sensor 3 and 4. In this embodiment, the additional laser is on the frame and the additional detector is on the sensor, while the reverse is true for the second embodiment. With this embodiment, the thickness d of the web is determined by the same formula that is used in conjunction with the embodiment illustrated in FIG. 2.

The resolution of the thickness gauge in accordance with the invention is between 5 and 10 $\mu$.

In one example, the two sensors 3 and 4 are separated by a distance A of about 100 mm. This distance is set at one time and at one position across the frame. Because of manufacturing tolerances, bending of the frame and thermal deflection, the distance A will vary along the rails across the frame. These variations are expressed as distances x1 and x2 and are measured either by laser 7 cooperating with sensor 10 or with sensor 12.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A gauge for measuring the thickness of a web, the gauge comprising:

a first sensor located above one side of the web and a second sensor located below the opposite side of the web;

each sensor having a laser which is aimed to direct a laser beam onto the respective side of the web adjacent to which the sensor is disposed, each sensor also having a detector which is positioned in relation to the web and to the respective laser so that the beam from the laser will be reflected from the web to the detector, and each detector including means for determining triangulation measurements of the distance between the respective sensor and the web;

means for defining a respective path of travel for each sensor spaced from the respective surface of the web and across the web;

a further laser for emitting a further laser beam and a further detector disposed in the path of the further laser beam, the further laser and the further detector being so located in the gauge that deviation in the vertical motion of at least one of the sensors in a direction toward or away from the web while the sensor is traveling along the path of travel across the web, shifts the further laser beam over the further detector responsive to the deviation of the motion of the sensor;

a zero calibration detector supported in the gauge, wherein the further laser beam emitted by the further laser is directed not only at the further detector, but also directed at the zero calibration detector for detecting deviations in the vertical motion of each of the sensors for determining zero calibration of the further detector; and means for combining the information from each of the detectors for adjusting the web thickness triangulation measurements dependent upon the deviating motion of the sensors along the path of travel.

2. The gauge of claim 1, wherein the further detector is capable of detecting motion toward and away from the respective sides of the web of each of the sensors.

3. The gauge of claim 1, wherein the means for defining a path of travel for each of the sensors across the web comprises a respective track for each sensor extending across the web, each of the sensors being supported on and movable along the respective track.

4. The gauge of claim 1, wherein for a traveling web, the direction of the path of travel of the sensors across the web is perpendicular to the travel direction of the web.

5. The gauge of claim 1, wherein the gauge is constructed so that the web can be transported through the gauge without the web being supported.

6. The gauge of claim 1, wherein the means for defining a path of travel further comprises means for synchronizing the travel of each of the sensors along their respective paths across the web, so that the laser beams from the lasers of each of the sensors directed at opposite sides of the web impinge on directly opposite locations on the respective sides of the web.

7. The gauge of claim 1, wherein each of the detectors is a position sensitive detector.

8. The gauge of claim 7, where each of the detectors is a position sensitive diode.

9. The gauge of claim 1, wherein the further laser is on one of the sensors while the further detector is supported in the gauge to be stationary with respect to movement of the one sensor and the further laser.

10. The gauge of claim 1, wherein the further detector is disposed on one of the sensors, while the further laser is supported in the gauge to be stationary with respect to movement of the further detector on the sensor.

11. The gauge of claim 10, further comprising a beam splitter located in the one sensor in the path of the further laser beam to the further detector for also directing the further laser beam to the zero calibration detector for enabling zero calibration of the further detector.

12. The gauge of claim 11 further comprising a frame supporting the gauge wherein each of the sensors are movable with respect to the frame, the further laser being supported in the frame and the zero calibration detector being supported in the frame in the path of the further laser beam directed from the beam splitter.

13. The gauge of claim 1, wherein the further laser is positioned on the first sensor, and the further detector is positioned n the second sensor and the further laser and the further detector are so disposed that the further laser beam is directed to shine on the further detector to indicate deviation in the vertical motion of at least one of the sensors.

14. The gauge of claim 1, wherein the further laser is positioned on at least one sensor and the further detector is supported in the gauge away from the one sensor carrying the further laser and the further detector is supported so that the further laser moves with respect to the further detector.

15. The gauge of claim 14, wherein there is a respective further laser positioned on each of the sensors and is a respective further detector supported in the gauge with respect to which each sensor moves.

16. The gauge of claim 15, further comprising a frame with respect to which the sensors are moved and further detector is supported on the frame.

17. A gauge for measuring the thickness of a web, the gauge comprising:
a first sensor located above one side of the web and a second sensor located below the opposite side of the web;
each sensor having a laser which is aimed to direct a laser beam onto the respective side of the web adjacent to which the sensor is disposed, each sensor also having a detector which is positioned in relation to the web and to the respective laser so that the beam from the laser will be reflected from the web to the detector, and each detector including means for determining triangulation measurements of the distance between the respective sensor and the web;
means for defining a respective path of travel for each sensor spaced from the respective surface of the web and across the web;
a further laser for emitting a further laser beam and a further detector disposed in the path of the further laser beam, the further laser and the further detector being so located in the gauge that deviation in the vertical motion of at least one of the sensors in a direction toward or away from the web while the sensor is traveling along the path of travel across the web, shifts the further laser beam over the further detector responsive to the deviation of the motion of the sensor;
mirror means disposed beyond one lateral edge of the web for deflecting the further laser beam, the further laser being aimed to direct the further laser beam toward the mirror means, and the further detector being aimed at the mirror means, whereby the further laser beam is deflected by the mirror means from the further laser to the further detector; and
means for combining the information from each of the detectors for adjusting the web thickness triangulation measurements dependent upon the deviating motion of the sensors along the path of travel.

18. The gauge of claim 17, wherein the further laser is positioned in the first sensor and the further detector is positioned in the second sensor.

19. A gauge for measuring the thickness of a web, the gauge comprising:
a first triangulation sensor located above one side of the web and a second triangulation sensor located below the opposite side of the web;
each sensor having a laser which is aimed to direct a laser beam onto the respective side of the web adjacent to which the sensor is disposed, each sensor also having a detector which is positioned in relation to the web and to the respective laser so that the beam from the laser will be reflected from the web to the detector, and each detector including means for determining triangulation measurements of the distance between the respective sensor and the web;
means for defining a respective path of travel for each sensor spaced from the respective surface of the web and across the web;
a frame for supporting the means defining the path of travel for the sensors;
a further laser for directing a further laser beam, and a respective further detector disposed in the path of the further laser beam, the further laser and the further detector being so located in the gauge that deviation in the vertical motion of at least one of the sensors in a direction toward and away from the web while the sensor is travelling along the path of travel across the web, shifts the further laser beam over the further detector responsive to the deviation in the vertical motion of the sensor.
mirror means disposed in the frame beyond a lateral edge of the web for deflecting the further laser beam from the further laser to the further detector; and
means for combining the information from each of the detectors for adjusting the web thickness triangulation measurements dependent upon the deviating motion of the sensors along the path of travel.

20. The gauge of claim 19, wherein the further laser is located in at least one of the sensors and the further detctor is located in the frame.